United States Patent Office 3,788,954
Patented Jan. 29, 1974

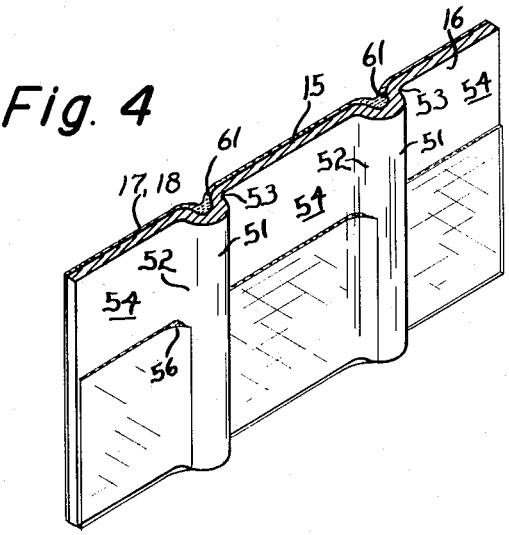
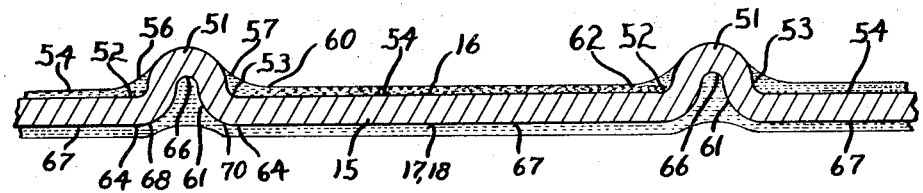
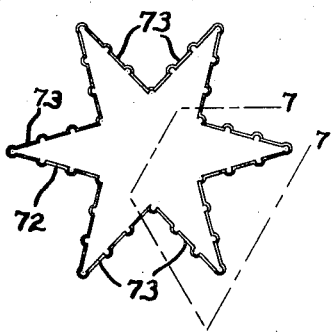
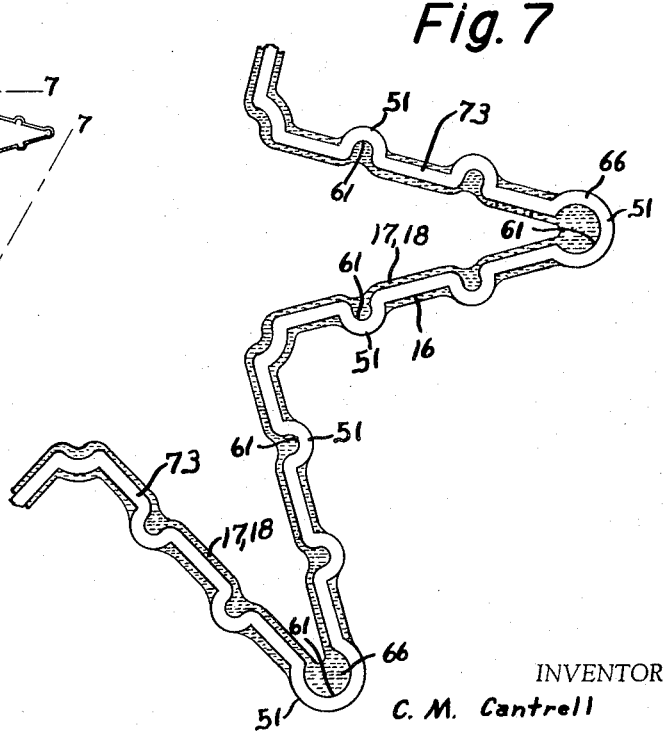

3,788,954
INTERPHASE MASS TRANSFER PROCESS FROM LAMINA FLOWING FILMS .005 IN. THICK
C. M. Cantrell, Richland, Wash., assignor of a fractional part interest to John P. Petrek, Kennewick, Wash.
Filed June 24, 1970, Ser. No. 49,419
Int. Cl. B01d 1/22, 3/00, 3/02, 3/08, 3/10, 3/28
U.S. Cl. 203—89
17 Claims

ABSTRACT OF THE DISCLOSURE

An interphase mass transfer process and apparatus is described for separating components in a binary or multi-component fluid in which the components have different vapor pressures and are transferred between their liquid and vapor phases. The liquid phase is spread into a film on a heat transfer surface and is directed over the surface in one direction. The vapor phase is directed over the film countercurrent to the flow and in intimate contact with the film with the liquid and vapor phases being in thermodynamic equilibrium. Simultaneously, heat is transferred between the surface and the film to transfer additional mass between the phases as the phases are flowing in thermodynamic equilibrium countercurrent to each other.

BACKGROUND OF THE INVENTION

This invention relates to interphase mass transfer processes and apparatus and more particularly to distillation and condensation processes and apparatus for separating components in a binary or multi-component mixture.

One of the basic treatises on the subject of distillation and separation is written by Lord Rayleigh and published in the November 1902 edition of the London, Edinborough, and Dublin-Philosophical Magazine and Journal of Science, entitled, "On the Distillation of Binary Mixtures." In this treatise, Lord Rayleigh described a distillation still consisting of a long tube of copper some 20 meters in length and 15 millimeters in diameter that is formed in a spiral and divided in half with a lower half surrounded in boiling water for distillation and the upper half maintained at a temperature of approximately 77° for condensing. In the operation of the equipment a distilland mixture of water and common alcohol was supplied at a uniform rate to the copper tube at approximately mid-point. The article states; "during the operation every part of the tube is occupied by double stream—an ascending stream of vapor and a descending stream of liquid. Between these streams an exchange of material is constantly taking place, the liquid, as it descends, becoming more aqueous, and the vapor, as it rises, becoming more alcoholic. In view of the slowness of the feed and the length of the tube, we may regard the liquid and vapor as being everywhere in approximate equilibrium."

Although such a process and apparatus may operate satisfactorily for some laboratory tests, it has been found that such a process and apparatus has not been satisfactory for commercial separation processes in obtaining equilibrium conditions between the liquid and vapor phases. Most present day distillation or condensation separation processes utilize a stripping/rectifying column with a boiler or reboiler to generate the vapor and pass the vapor upward through the column and condense the vapor leaving the column returning a portion of the condensate as reflux to the column to pass downward through the column as drops or as a continuous stream. The purpose of the separation column is to enrich the volatile components in the vapors arising from the still or reboiler by allowing these vapors to interact with the distilland and the condensate produced by the partial condensation of the vapors previously given off by the same still. The most common type of column employs a succession of plates covered with liquid through which the vapor bubbles. This type of column is generally referred to as a "bubble plate tower." In such a column the vapor bubbles up through vertically spaced plates, each containing liquid to theroretically transfer in stages the more volatile components from the liquid to the vapor and to transfer the less volatile components from the vapor to the liquid under equilibrium conditions at each stage. However, in practice, thermodynamic equilibrium approaching one hundred percent efficiency is not reached between the vapor phase and the liquid phase. The difference between the actual efficiency and the theoretical efficiency is generally defined in terms of plate efficiency. Numerous different types of plate structures and configurations have been devised with the objective of improving the plate efficiency.

The second most common type of separation column is termed a "packed tower." Such a tower is filled with packing material termed "rings" or "saddles" or other similar materials to disperse the liquid over the surface of the packing material and hopefully enable the upward flowing vapor to contact the downward flowing liquid. The use of a packed tower has serious limitations. Frequently the downward flowing liquid will not maintain uniform distribution or will coagulate into drops and flow as a stream through the column to seriously effect the intimate contact of the vapor and liquid. Such uneven distribution makes the packed tower impractical for large diameters except for experimental work and for special purposes. The packed tower also presents special cleaning problems.

One of the principal objects of this invention is to provide an interphase mass transfer process and apparatus that more nearly approaches the theoretical thermodynamic equilibrium in transferring the more volatile components from the liquid phase to the vapor phase and transferring the lese volatile compounds from the vapor phase to the liquid phase.

An additional object of this invention is to provide a separation process and apparatus for separating components of a multi-component fluid with substantially greater efficiencies than has been available with packed towers or bubble plate towers.

A further object of this invention is to provide an interphase mass transfer that costs less to construct and maintain then packed towers or bubble plate towers having similar output capabilities.

An additional object of this invention is to provide an interphase mass transfer process that is adaptable for isotope separation with substantially greater efficiency than previously obtained from prior distillation processes.

A further object of this invention is to provide an interphase mass transfer process and apparatus that is capable of operating at higher separation efficiencies to accomplish sharper and more distinct separation of components in a multi-component fluid.

An additional object of this invention is to provide an interphase distillation and condensation mass transfer process that does not require refluxing to achieve separation.

A further object of this invention is to provide an interphase mass transfer process in which the energy requirements are considerably lower than those normally associated with packed towers or bubble plate towers.

An additional object of this invention is to provide an interphase mass transfer distillation and condensation apparatus having higher co-efficiencies of heat transfer and separation factors.

These and other objects and advantages of this invention will become apparent upon the reading of the following detailed description of a preferred embodiment.

BRIEF DESCRIPTION OF THE DRAWINGS

A preferred embodiment of this invention is illustrated in accompanying drawings, in which:

FIG. 4 is a fragmentary perspective view of a section of a heat transfer wall principally illustrating a distillation surface;

FIG. 5 is a cross-sectional view of the wall shown in FIG. 4;

FIG. 6 is a cross-sectional view of the wall showing the wall formed in a tube having a star-shaped cross-section; and FIG. 7 is an enlarged fragmentary view of a section of the star-shaped tube illustrating the configuration of the wall and the surfaces.

DETAILED DESCRIPTION OF A PREFERRED EMBODIMENT

As previously mentioned, this invention is concerned with the separation of components of a fluid by transferring mass between a liquid phase and a vapor phase of such fluid in which the components have different yet significant vapor pressures.

In the broad aspect this invention is accomplished by flowing the liquid phase as a liquid film in one direction over a heat transfer surface and flowing the vapor phase in an opposite direction countercurrent to and in intimate contact with the liquid film to maintain essentially thermodyamic equilibrium between the vapor phase and the liquid phase while simultaneously transferring heat between the liquid phase and the heat transfer surface to transfer mass between the liquid and vapor phases while the phases are flowing countercurrent to each other. More specifically, the liquid phase is spread over a substantially flat surface to form a thin liquid film and is directed to flow in essentially a laminar flow over the flat surface. The vapor is directed countercurrent to the flow of the thin fluid film to maintain intimate contact with the surface of the film. Heat is transferred to or from the liquid to transfer mass between the liquid and vapor phases while the phases are essentially in thermodynamic equilibrium progressively concentrate the more volatile component in the vapor and the less volatile component in the liquid as the phases flow countercurrent to each other over the surface. If it is desired to distill a portion of the liquid, heat is added to the flat heat transfer surface to add heat to the thin liquid film and evaporate a portion of the liquid as the film flows over the surface. In this manner, all of the vapor that has passed over the heat transfer surface will have a concentration of components essentially equal to that of a vapor in equilibrium with the saturated liquid feed to the heat transfer surface. If it is desired to condense a portion of the vapor, heat is removed from the film to transfer mass from the vapor phase to the liquid phase with the liquid leaving the heat transfer surface having a concentration essentially equal to that of a liquid in equilibrium with the saturated vapor feed to the heat transfer surface.

As used in this disclosure a liquid film is used to differentiate from a liquid stream. A liquid film is spread out in a manner in which the thickness of the film is extremely small in comparison to the width or length. The liquid film has a substantially constant thickness in which the surface of the film is substantially unaffected by surface or capillary forces and is parallel to the supporting surface. A thin film is defined as a film having a thickness less than 0.005 of an inch. For water, a thin film is defined having a thickness less than 0.001 of an inch.

Figure 1:
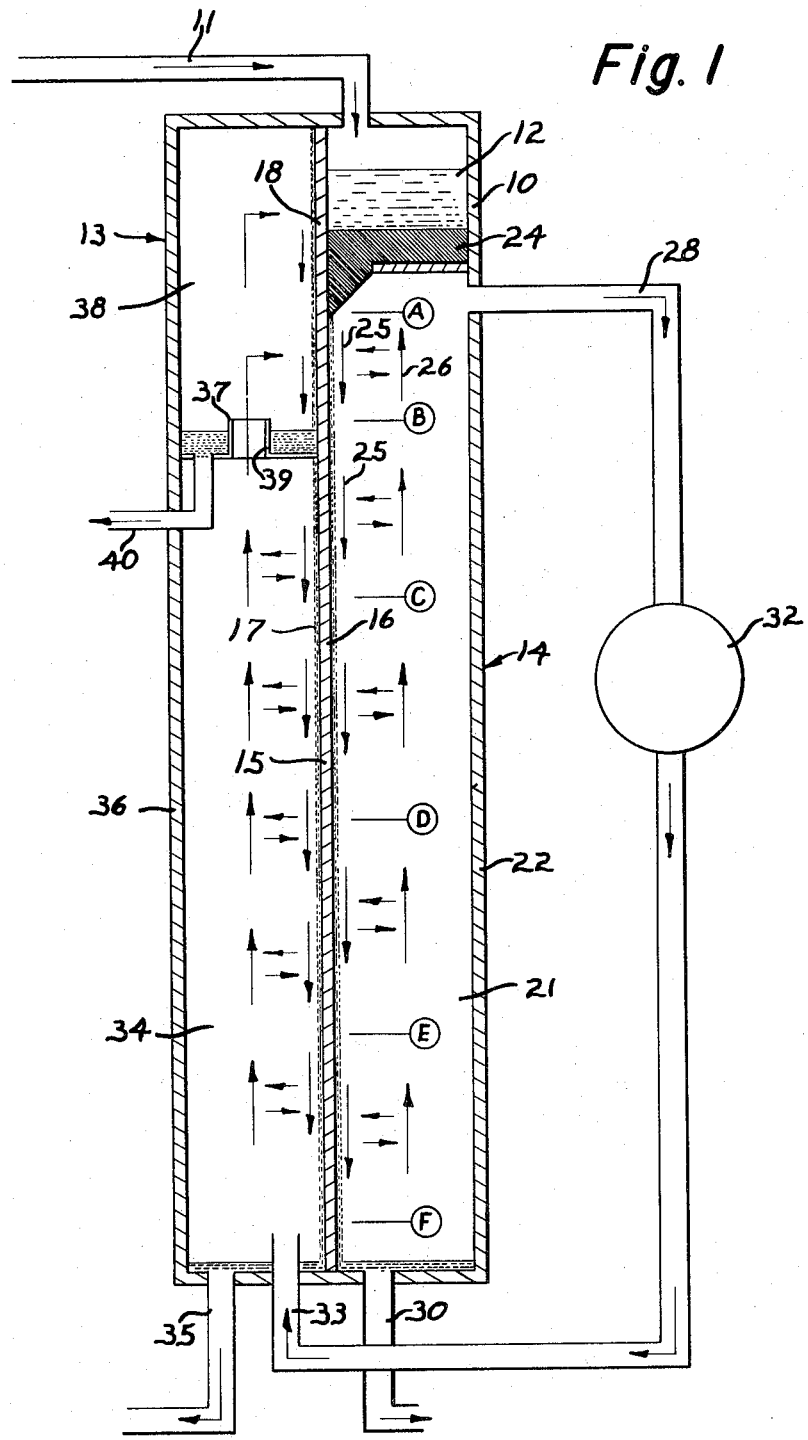
FIG. 1 is a flow diagram illustrating the principal steps in performing the process and the apparatus required in carrying out said process of this invention.

Referring now to FIG. 1 there is shown an enclosure 10 having an infeed fluid line 11 that feeds a multi-component liquid into a reservoir 12 at the top of the enclosure. The enclosure 10 is divided having two principal sections 14 and 13 for distillation and condensation respectively. A vertical heat trasfer wall 15 divides the two sections 13 and 14. The wall 15 has a distillation surface 16 on one side thereof and condensate surfaces 17 and 18 on the other side thereof. The distillation section 14 has an elongated distillation chamber 21 that is confined by the distillation surface 16 and a wall 22 of the enclosure 10. A means 24 to distribute the liquid over the distillation surface 16 is mounted in the reservoir 12 communicating with the chamber to transmit the liquid from the reservoir to the surface 16. The wall 15 by its inclination causes the liquid to flow downward over the surface 16 by gravity. The surface 16 is so designed to cause the liquid to spread out into a liquid film over at least a majority of the surface as the liquid flows downward. Arrows 25 indicate the direction of the flow of the liquid on the surface 16.

Heat is transferred through the wall 15 to vaporize only a portion of the liquid flowing over the entire surface 16. The more volatile components of the liquid vaporize more readily with the vapor formed from evaporation having an increased concentration of the more volatile components. As the vapor is formed the vapor is directed upwardly in the direction of the arrows 26 countercurrent to and in intimate contact with the liquid film to transfer mass from the liquid phase to the vapor phase and from the vapor phase to the liquid phase in essentially thermodynamic equilibrium while heat is being added to evapoarte part of the liquid. Both of these physical mass transfer processes are taking place simultaneously so that the liquid as it flows down the surface 16 progressively increases in concentration of the less volatile components while decreasing its concentration of the more volatile components. The vapor on the other hand is progressively increasing its concentration of the more volatile components as the vapor moves progressively up the surface 16 in the distillation chamber 21.

Through this process all of the vapor that passes over the entire surface 16 leaving the distillation chamber 21 through line 28 has component concentrations essentially equal to the saturated equilibrium vapor concentrations of the liquid feed to the heat transfer surface.

The liquid leaving the surface 16 through an outlet line 30 has component concentrations essentially equal to the equilibrium liquid concentration of the vapor generated at the lower end of the distillation chamber 21.

The condensation section 13 has an elongated lower condensation chamber 34 and an upper condensation chamber 38 which both have the common wall 15.

The vapor removed from the distillation chamber 21 through line 28 is compressed by a compressor 32 and then is admitted through an inlet line 33 to the elongated lower condensation chamber 34 that is defined by a wall 36 of the enclosure 10 and the condensation surface 17. The vapor is compressed by the compressor 32 to raise the pressure and temperature of the vapor to provide a temperature differential between the surface 17 and the surface 16 to transfer the latent heat of evaporation through the wall 15 to the distillation surface 16.

An important feature of this invention is that only a portion of the vapor is condensed on the surface 17 as it moves upwardly over the surface 17. The distillate formed on the condensate surface 17 is directed downwardly by gravity in a film over the entire surface countercurrent to and in intimate contact with the upward flowing vapor to not only transfer mass from the vapor phase to the liquid phase by condensation but also transferring mass between the vapor phase and the liquid phase under equilibrium conditions as the liquid phase and vapor phase flow countercurrent to each other. As the vapor flows upwardly the less volatile components will condense faster than the more volatile components thereby decreasing the less volatile components in the vapor as it moves upwardly countercurrent and in equilibrium with the distillate. Conversely as the liquid moves downwardly in a film over the condensate surface 17 the liquid increases its concentration of the less volatile components and decreases its concentration of the more volatile components so that when the distillate has passed over the surface 17 and is removed from the condensate chamber 34 through the line 35 it will have a component concentration that is essentially equal to the saturated liquid equilibrium concentration of the vapor entering chamber 34. The liquid flowing through line 35 is concentrated in the less volatile components in comparison to the feed vapor in line 33.

The chambers 34 and 38 are divided by a baffle 39, that has a passageway 37 between the chambers 34 and 38 to permit the vapor not condensed in chamber 34 to flow into the chamber 38. The surface 18 is designed to condense all of the vapor flowing into the chamber 38. The latent heat of vaporization is transferred through the wall 15 from the condensate surface 18 to the distillation surface 16. It should be noted that the condensate surfaces 17 and 18 are directly opposite the distillation surface 16.

The distillate formed on the surface 18 flows downwardly to the bottom of the chamber 38 and is removed from the chamber 38 through a line 40. The component concentrations of the liquid flowing from the line 40 is essentially equal to the concentrations of the components of the vapor flowing into the chamber 38. The liquid flowing through the line 40 in comparison to the feed liquid in the reservoir 12 has a concentration high in the more volatile components and a concentration low in the less volatile components.

To accomplish this separation process, the only heat that is added to the system is provided by the compressor 32 to raise the pressure and temperature of the vapor so that condensation takes place at a higher saturation temperature. It may be desirable to add additional heat to the vapor or liquid because of heat losses in the apparatus.

WATER-ALCOHOL SEPARATION

An example of the effectiveness of this process can be readily illustrated in separating ethanol alcohol from water contained in a ethanol-water mixture containing 9% ethanol. The distillation surface 16 is divided into vertical segments A–F for illustration purposes (FIG. 1) with the liquid flowing down the surface 16 in a thin film. It will be assumed that liquid passing point D has an ethanol concentration of 3% with a flow rate of 11,075.3 lb./hr. and a heat content of 173.7 B.t.u./lb., and that the liquid passing point E has an ethanol concentration of 2% and a flow rate of 10,792.8 lb./hr. and a heat content of 176.0 B.t.u./lb. The vapor passing upward at point E has an equilibrium ethanol concentration of 19.2% and a flow rate of 593 lb./hr. and a heat content of 1,016 B.t.u./lb. The vapor passing point D has an equilibrium ethanol concentration of 26.3% and a flow rate of 875.5 lb./hr. and a heat content of 967 B.t.u./lb.

The amount of heat added to the distillation heat transfer surface 16 in the increment between D and E is 218,873 B.t.u./hr. to evaporate 282.5 lb./hr. of the fluid. Since the evaporated vapor flows countercurrent to and in intimate contact with the thin film thereby maintaining thermodynamic equilibrium between the liquid and vapor phases all of the vapor moving past D has an ethanol concentration essentially equal to the equilibrium ethanol vapor concentration of the liquids at point D, which is 26.3%. Of the 282.5 lb./hr. of liquid evaporated—116.4 lb./hr. is ethanol and 166.1 lb./hr. is water. Had the 282.5 lb./hr. of vapor not been directed countercurrent in thermodynamic equilibrium with the liquid film but merely collected and averaged with the 593 lb./hr. of the vapor generated below E, then the average ethanol concentration in the vapor would have been 21.5% and the amount of ethanol and water evaporized between D and E would have been 74.3 lb./hr. and 208.2 lb./hr. respectively. Thus by flowing the vapor countercurrent to and in intimate contact with the liquid film to maintain a thermodynamic equilibrium between the phases while heat is being added, the production of ethanol is increased 57%. It should be understood that the evaporation and equilibrium transfer between the liquid and vapor phases takes place simultaneously so that as the vapor moves upward, more of the less volatile components transfer into the liquid phase generating heat to evaporate more of the more volatile components into the vapor to provide an equilibrium transfer at the same time as mass is being transferred from the liquid to the vapor by the heat added to the distillation surface 16.

Figure 2:
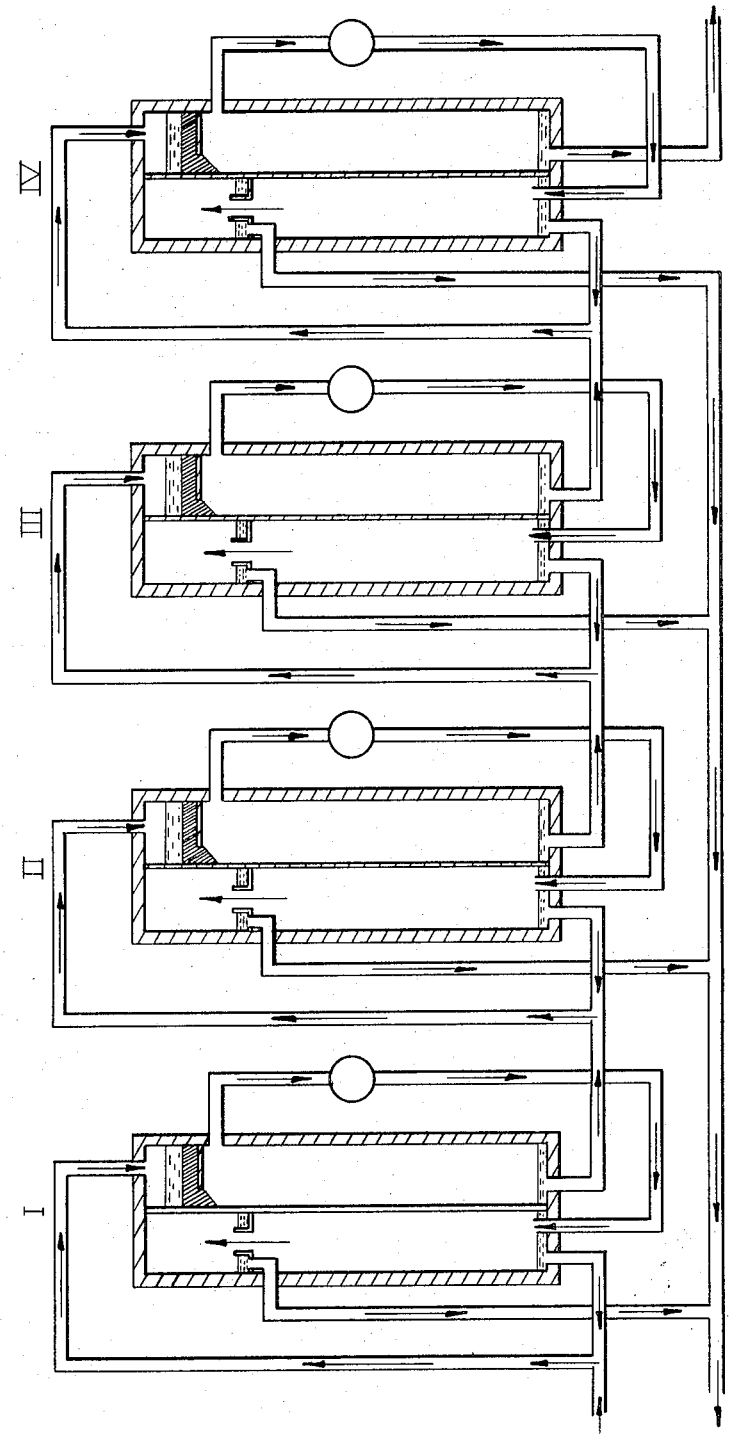
FIG. 2 is a flow diagram illustrating a series of interconnected stages utilizing the principles of the invention.

It may be desirable to accomplish the separation in stages when the difference of the equilibrium saturation temperatures of the product is substantial. The flow diagram for a separation to be accomplished in four stages is shown in FIG. 2. For purposes of illustration it will be assumed that it is desired to obtain an 88% isopropyl alcohol product from a water-isopropyl alcohol feed liquid having a 50% isopropyl alcohol concentration, with the waste liquid containing less than 1% alcohol. The feed liquid is fed to the first stage at a rate of 50,200 lb./hr. at 178° F. Liquid from the lower condensation chamber of the first stage, also having a 50% alcohol concentration, is mixed in the feed liquid at a rate of 3,886 lb./hr. for a total feed to the distillation chamber of 54,106 lb./hr. In the distillation chamber, 23,814 lb./hr. is vaporized at 14.7 p.s.i.a., according to the principals of this invention having an 81.8% alcohol concentration. The vapor is then compressed to raise the pressure to 15.6 p.s.i.a. adding 54,750 B.t.u./hr. to the vapor. The compressed vapor is directed into the lower condensation chamber in which 3,886 lb/hr. is condensed with the latent heat of vaporization being transferred through the wall 15. The condensed liquid has a 50% alcohol concentration and is mixed with the feed liquid as previously mentioned. The remaining vapor has an 88% alcohol concentration and passes into the upper condensation chamber for total condensation to produce 19,928 lb./hr. of 88% alcohol first-stage product. The liquid (30,292 lb./hr.) leaving the distillation chamber has an alcohol concentration of 25% and a temperature of 180.3° F. This is mixed with 934 lb./hr. of distillate from the lower condensation chamber of the second stage to provide a combined feed to the second stage of 31,226 lb./hr. Of this amount 6,759 lb./hr. is vaporized at 14.7 p.s.i.a. having an alcohol concentration of 79.3%. The produced vapor is compressed to 17.3 p.s.i.a. adding 41,900 B.t.u./hr. and emitted into the lower condensation chamber of the second stage A portion (934 lb./hr.) is condensed in the lower condensation chamber generating a distillate of 25% alcohol. The remaining vapor is totally condensed in the upper condensation chamber producing 5,825 lb./hr. of 88% alcohol second-stage product. The liquid (24,467 lb./hr.) leaving the second-stage distillation chamber has a 10% alcohol concentration and a temperature of 184.8° F. This is mixed with 437 lb./hr. of third-stage distillate from the lower condensate chamber to provide a combined third-stage feed of 24,904 lb./hr. Of this, 2,185 lb./hr. is vaporized at 14.7 p.s.i.a having an alcohol concentration of 72.4%. The vapor is compressed to 24.1 p.s.i.a. adding 43,900 B.t.u./hr. to the vapor. The compressed vapor is directed into the lower condensation chamber of the third-stage to condense 437 lb./hr. at 10% alcohol. The remaining vapor is condensed in the upper chamber to produce a third-stage product 1,748 lb./hr. of 88% alcohol. The liquid (22,719 lb./hr.) leaving the third-stage distillation chamber has a temperature of 200.8° F. and a 4% alcohol concentration. This liquid is added to 765 lb./hr. of distillate from the lower condensation chamber of the fourth stage for a total feed to the fourth-stage of 23,484 lb./hr. A portion of the liquid is vaporized to produce 1,674 lb/hr. of 49.6% alcohol leaving a 0.5% alcohol waste liquid of 21,810 lb./hr. The vapor is compressed to 20.5 p.s.i.a. adding 54,120 B.t.u./hr. The compressed vapor is partially condensed in the lower condensation chamber to produce 765 lb/hr. of 4% liquid. The remainder of the vapor is condensed in the upper chamber to produce a fourth-stage product of 909 lb./hr. of 88% alcohol. The products added together from the fourth stages amount to 28,410 lb./hr. It should be noted that the separation was accomplished with an average addition of less than 7 B.t.u./lb. of final product. It should be noted that the multiple staging and recycle provide a process that is self-regulating, greatly minimizing the control equipment required for its operation.

LIQUID INDUSTRIAL WASTE SEPARATION

There are many industrial waste products containing two or more liquid components in which one or more may be of value if efficiently separated from the others. Examples of such waste products include aqueous-acid mixtures, such as sulfuric acid, nitric acid, hydrochloric acid and other mineral acids. Another example of an industrial waste is an aqueous solution having about 10% $NH_3$. If the waste is dumped into streams or rivers, serious pollution would result. This invention enables the separation to be accomplished efficiently to recover a valuable chemical while at the same time removing the chemical from the water to prevent contamination and pollution. For illustration purposes, it is assumed that the waste liquid is delivered to the apparatus at the rate of 10,000 lb./hr. at 200° F. and 32 p.s.i.a. with a $NH_3$ concentration of 10%. By processing the liquid according to this invention in the distillation chamber 1515 lb./hr. of 66% $NH_3$ vapor can be removed leaving 8485 lb./hr. of water having essentially 0% $NH_3$. The vapor leaves the chamber at 200° F. and the water leaves at 255° F. The 66% $NH_3$ vapor is quite valuable and is used as a starting material for a chemical reaction such as in the formation of ammonium nitrate. To accomplish this separation approximately $1.4 \times 10^6$ B.t.u./hr. of heat were passed through the wall 15 to the distillation chamber.

At this point it should be pointed out that another gas or vapor having a substantial vapor pressure may be injected into the distillation chamber to lower the temperature at which the desired distillation or condensation can take place. This may greatly lower the equipment costs.

ISOTOPE SEPARATION

Although the separation of isotopes utilizing a distillation process is not new in itself, it has been found that most prior art distillation processes have been quite inefficient. An example of such a prior art process is the distillation process utilized by the Manhattan Project to obtain heavy water from natural water. Three water distillation plants were designed, built, and operated during World War II. The most efficient plant consisted of an eight stage cascade of bubble plate towers and packed towers with associated reboilers, condensors and pumps. Feed for each tower was provided by condensate from the condensor which was passed downwardly through the tower countercurrent to the upward flow of the vapor from the reboiler. It was found that approximately 200,000,000 B.t.u.'s per hour was required to obtain 0.85 pound per hour of 89% heavy water. It was found that the distillation towers were only about 50% efficient. These plants were shut down in 1946 because these inefficiencies resulted in excessive cost. Since that time, the world's supply of heavy water has in the most part been produced by electrolysis or by dual temperature hydrogen sulfide processes. It is well known that natural water contains about 149 parts per million of $D_2O$ (heavy water) with the separation factor of $H_2O$ (light water) to $D_2O$ (heavy water) being approximately 1.05 at 40° C. The separation factor is defined as a ratio of the concentration of $D_2O$ in the liquid phase to its concentration in the vapor phase at equilibrium saturation conditions. The separation factor may also be expressed as the square root of the ratio of the vapor pressure of $D_2O$ to $H_2O$.

In utilizing this process the distilland is fed into the reservoir 12 and is spread over the surface 16 in a thin film that flows down the surface by gravity over substantially the entire surface. As the distilland flows down the surface, heat is transferred through the wall 15 to evaporate only part of the water from the thin film. $D_2O$ concentration in the liquid progressively increases as the water flows downward over the surface 16.

As the vapor is generated, it is directed upwardly by the wall 22 countercurrent to the downward flow of the thin liquid film and in intimate contact with the thin film to transfer mass between the two phases under substantially thermodynamic equilibrium conditions. As the vapor moves up the film, more $H_2O$ molecules transfer to the vapor than $D_2O$ molecules. The $D_2O$ enriched liquid is the lower end of the distillation chamber 21 is drained through line 30. The $D_2O$ depleted vapor is removed from the distillation chamber 21, after it is passed over the surface 16, through the line 28. The vapor leaving through line 28 has a $D_2O$ concentration essentially equal to the saturation equilibrium vapor concentration of the feed liquid (natural water). To more clearly demonstrate this point, it will be assumed for purpose of illustration that it is desired to obtain 85 lbs. per hour of 89% $D_2O$. To accomplish this, approximately 8,968,230 lb./hr. of natural water is fed into the reservoir 12 and passes over the distillation surface 16 at A. The concentration of the liquid at point A is .0149%. Between A–B sufficient heat is added to evaporate 8,118,230 lb./hr., leaving 850,000 lb./hr. of liquid flowing past B. Sufficient heat is added to the surface 16 between sections B and F to successively evaporate sufficient water to leave 85,000 lb./hr. flowing into the third section at C, 8,500 lb./hr. flowing into the fourth section at D, 850 lb./hr. flowing to the fifth section at E and 85 lb./hr. flowing from the surface at F. The 85 lbs./hr. flowing from the surface 16 at F contains 89% $D_2O$ and is drained from the distillation chamber 21 through line 30 as a product. Chart 1 shows the pounds per hour of vapor generated between each section and the concentration of $D_2O$ in the liquid and vapor phases at each point on the surface.

CHART 1

| Vertical location | Flow, lbs./hr. | | Concentration, percent $D_2O$ | |
|---|---|---|---|---|
| | Liquid | Vapor | Liquid | Vapor |
| A | 8,968,230 | 8,968,145 | 0.0149 | .0140566 |
| B | 850,000 | 849,915 | 0.15697 | 0.148086 |
| C | 85,000 | 84,915 | 1.54796 | 1.4594 |
| D | 8,500 | 8,415 | 13.4772 | 12.7143 |
| E | 850 | 765 | 58.9625 | 55.625 |
| F | 85 | 0 | 89.0 | |

The vapor leaving the distillation chamber is compressed to raise the pressure and temperature of the vapor and then is injected into the condensation chambers 34 and 38 to condense on the condensation surfaces 17 and 18 and transfer the latent heat of evaporation through the wall 15 to the distillation surface 16. The total heat added to the vapor by the compressor 32 is approximately 90,000,000 B.t.u.'s per hour to produce 85 lb./hr. of 89% $D_2O$. This compares quite favorably to the prior distillation process (Manhattan Project) which require 200,000,000 B.t.u.'s per hour to produce only 0.85 lb./hr. of 89% $D_2O$.

To substantially increase the percentage recovery of $D_2O$ from natural water, the distillate from line 35 may be recycled back to the feed line 11 with only a portion of the feed liquid containing make-up natural water. Under such a condition the distillate from line 35 would be mixed with approximately 756.458 lb./hr. of natural water to constitute a feed liquid of 9,061,916 lb./hr. of feed liquid having a $D_2O$ concentration of 0.01475%. The feed liquid is fed into the reservoir 12 at 101° F. and at 0.978 p.s.i.a. The liquid flow is spread into a thin film over the surface 16. Heat is transferred through the wall 15 to evaporate most of the liquid as it flows over the distillation surface. The vapor is directed countercurrent to and in intimate contact with the thin film to maintain essentially thermodynamic equilibrium between the vapor and the liquid to exchange mass therebetween and thereby increase the $D_2O$ concentration in the liquid and decrease the $D_2O$ concentration in the vapor as they flow countercurrent to each other. Sufficient heat is transferred to the distillation heat transfer surface 16 to produce 9,061,932 pounds of vapor having a $D_2O$ concentration equal to the saturation equilibrium condition of the feed liquid (0.01392%). The vapor removed from chamber 21 is compressed to increase the temperature to approximately 103° and to increase the pressure of 1.0695 p.s.i.a. The recompressed vapor is discharged through line 33 into the bottom of the condensation chamber 34. The vapor is directed upward over the condensation surface 17 to condense the majority of the vapor on the surface 17 which in turn directs the liquid downwardly as a thin film to efficiently transfer the latent heat of evaporation through the wall 15 to the distillation surface 16. The distillate formed on the surface 17 (8,305,458 lb./hr.) is removed from the chamber 34 having a $D_2O$ concentration of 0.01474%. In this embodiment, line 35 is connected to feed line 11 to recycle the distillate into the reservoir 12. The vapor not condensed on the surface 16 (756,373 lb./hr.) passes through the passageway 37 to the second condensation chamber 38. The vapor passing in the chamber 38 is totally condensed on the surface 18 to form a second distillate. The distillate formed on surface 18 is removed from the chamber as a waste having a $D_2O$ concentration of 0.0049% $D_2O$. This compares with the natural water input concentration of $D_2O$ of 0.0149%. Thus approximately two-thirds of the $D_2O$ is removed from the natural water using this process. The amount of heat required to recompress the vapor from the distillation chamber 21 is approximately 90,000,000 B.t.u.'s/hr.

It should be noted that in the example approximately 66% of the heavy water in the feed liquid was recovered in comparison with the previous distillation process in which less than 5% was recovered.

Figure 3:
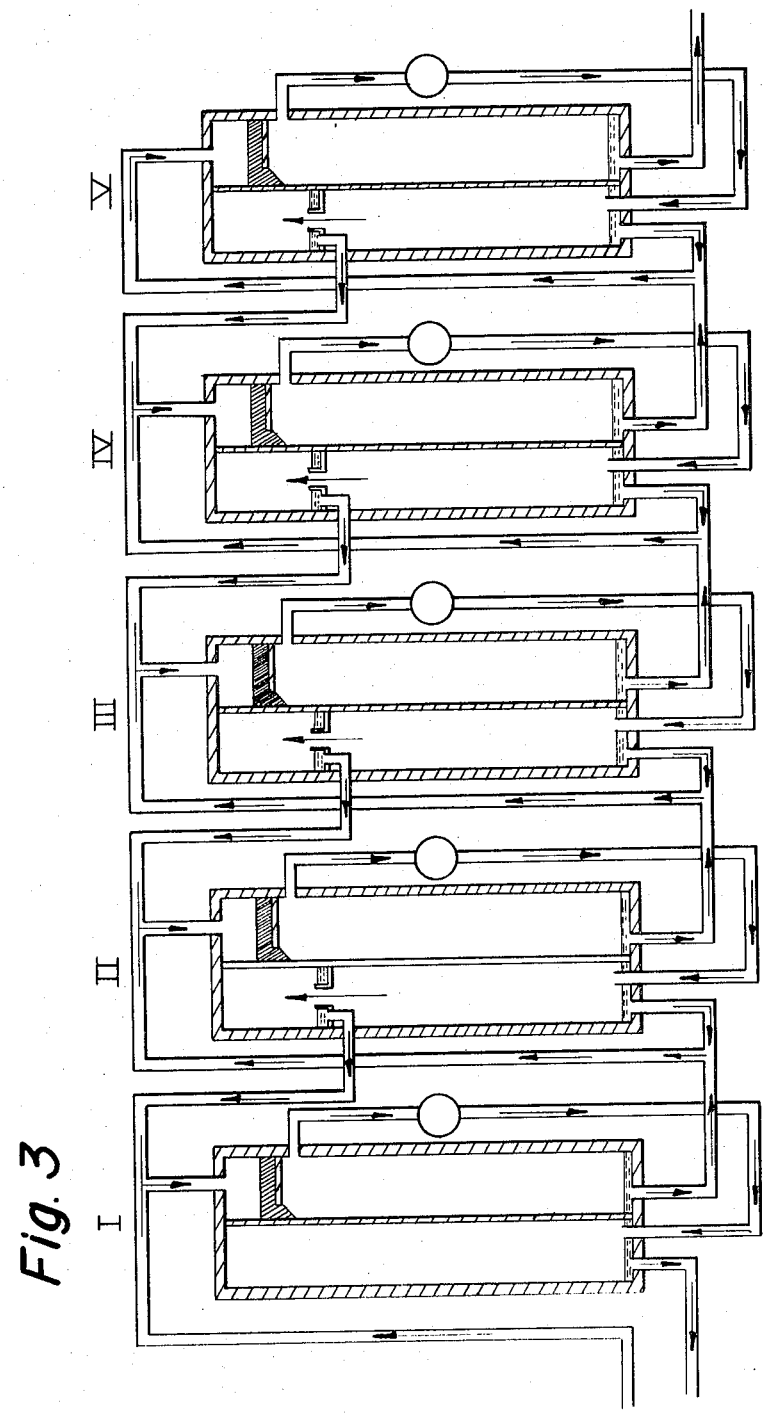
FIG. 3 is a flow diagram illustrating a series of interconnected stages showing an alternate method of utilizing this invention.

It may be desirable to accomplish separation in a multistage sequence as illustrated in FIG. 3 when there is a small separation factor between the desired components, such as isotopes. FIG. 3 shows the distillate from the upper or second condensation chamber of one stage being recycled back to an upstream stage to serve as a distill and feed for the upstream distillation chamber. Similarly, the distillate from the first or lower condensation chamber of one stage is recycled back to serve as a distilland for the distillation chamber of the same stage. As illustrative of such a process, it will be assumed that 8,915,419 lb./hr. of an aqueous solution is fed to the stage I having a $D_2O$ concentration of 0.0149%. This amount is added to 52,811 lb./hr. of distillate having 0.0149% $D_2O$ from the upper distillation chamber of stage II for a combined distilland feed of 9,968,240 lb./hr. to the stage I distillation chamber. Of this amount, 8,915,334 lb./hr. is vaporized having a $D_2O$ concentration of 0.0140°%. The vapor is compressed and directed to the stage I condensation chamber for complete condensation as a system waste product. The distilland not distilled in the stage 1 distillation chamber (52,896 lb./hr.), of 0.157% $D_2O$, is added to 791,732 lb./hr. of distillate from stage II lower condensation chamber also having a $D_2O$ concentration of 0.157%. Furthermore, 5,372 lb./hr. of 0.157% $D_2O$ from the upper condensation chamber of stage III is added to the stage II feed to provide a combined stage II distilland feed of 850,000 lb./hr. It should be noted at this point that there has been a more than 30 to 1 reduction in the quantity of feeds between stage I and stage II.

Approximately 844,543 lb./hr. is vaporized in the stage II distillation chamber containing 0.1481% $D_2O$, leaving a stage II product of 5.457 lb./hr. of 1.548% $D_2O$. The vapor is compressed and supplied to the stage II lower condensation chamber for partial condensation. Of this amount, 791,732 lb./hr. is condensed with the remaining 52,811 lb./hr. passing to the upper condensation chamber for complete condensation. The product from stage II is added to the distillate from the lower condensation chamber of stage III and the distillate from the upper condensation chamber of stage IV to provide a combined stage III distilland feed of 85,000 lb./hr. of 0.1458% $D_2O$. Stage III produces a product of 612 lb./hr. of 13.48% $D_2O$. The product is processed in a similar manner in stage IV and V producing 141 lb./hr. of 58.96% $D_2O$ in stage IV and 85 lb./hr. of 89% $D_2O$ in stage V. The total heat required to compress the vapor produced at the stage is approximately $98.5 \times 10^6$ B.t.u.'s/hr.

In the heavy water-light water separation, the thin film on the distillation and condensation surfaces should have thickness less than 0.001 inch and more preferably less than 0.00015 inch.

Although these examples specifically show the recompression of the produced vapor and utilization of the latent heat of vaporation in the same stage, it should be understood the invention is equally applicable to the use of latent heat of vapor without recompression in downstream or other stages for condensing on a condensation surface and transferring the latent heat of vaporization to a distillation surface of another stage. Many such embodiments may be particularly desirable when inexpensive steam is available at a temperature substantially in excess of the boiling point of one of the components for use in the first stage so that the vapor from the second and subsequent stages may be used in providing the necessary heat of vaporization for the adjacent downstream stage without the need of vapor compression.

APPARATUS

The wall 15 is constructed of thin flat metal sheet material having a high thermal conductivity. One side of the sheet material (FIGS. 4 and 5) is utilized for the distillation surface 16 and the other side is utilized in the condensation surfaces 17 and 18. Fluted grooves are formed in the sheet material at evenly spaced intervals to provide convex projecting ribs or guides 51 in the distillation surface 16 and concave indented ribs or guides 61 in the condensation surfaces 17 and 18. The ribs 51 project outward and divide the surface 16 into a plurality of flat surface areas 54 for supporting distilland thin films. It is very important that the surface supporting the thin film is substantially flat and unaffected by surface curvature. The ribs 51 extend outwardly from the distillation surface to cause the liquid to flow in rivulet streams down the surface in feed channels 52 and 53 along both sides of the ribs 51 and to spread out laterally into thin film on the flat surface areas 54. The thin film extends from point 60 and 62 before the surface tension and the capillary action of the convex ribs 51 dominate the surface shape of the liquid to form the thickened liquid streams 56 and 57. The distance between the ribs 51 is sufficient to form a thin film in the flat area over the major portion of the entire distillation surface 16. It has been found that this construction can produce a thin film over greater than 70% of the total distillation surface 16.

The indented guides 61 on the condensation surfaces 17 and 18 are directly opposite the projecting guides 51 of the distillation surface 16 and form intended flow channels 66. The indented guides 61 divide the surfaces 17 and 18 into a plurality of flat surface areas 67. The flat surface areas 67 terminate at point 64 communicating with convex surfaces 68 and 70 that form walls of the grooves 66. It should be noted that the flat areas 67 are directly opposite the flat areas 54 so that the formed thin films on the distillation and condensation surfaces are directly opposite each other to provide a most efficient heat transfer between a distillate and a distilland.

As the vapor is condensed on the condensation surface 17 and 18, a thin film is formed in the flat areas 67 and then by surface tension action are drawn laterally by the curvature of convex surfaces 68 and 70 into the grooves 66 for flow downward in the grooves 66 in rivulet streams.

Sections of the wall 15 may be alternately folded in accordion fashion to provdie a large surface area in a limited space.

The sheet material may also be formed in the shape of a tube 72 (FIGS. 6 and 7) having a star-shaped cross section with a plurality of fingers 73. Condensation surfaces 17 and 18 are formed on one side of the fingers with the distillation surface 16 formed on the other side of the tube. The spacing between the fingers may be varied as desired to control the amount and flow of the vapor along the surfaces.

This construction has considerable advantages over the wall construction shown in U.S. Pat. No. 3,291,704 and No. 3,358,750. The heat transfer wall shown in U.S. Pat. No. 3,291,704 shows a corrugated wall utilizing one side as a distillation surface and the other side as a condensation surface with no flat or substantially flat surfaces on which to form any significant thin film. The corrugated wall structure also has the disadvantage of being unable to support thin films directly opposite each other. The U.S. Pat. No. 3,358,750 shows a cylindrical tube having a convex condensation surface formed on the outside of the tube with projecting fins extending the length. The curvature of the condensation surface appears to be quite important for drawing the liquid into channels adjacent the fins. The applicant has found the most effective condensation surface requires an indented groove to be formed adjacent flat film areas to draw the liquid from the thin film by surface tension action.

The surfaces 16, 17 and 18 may be constructed having various surface conditions or textures depending upon the liquid and the application. Under some circumstances it may be desirable to have a smooth surface or a slightly roughened surface. It may also be desirable to have small scratches formed in the surface.

The maintenance of thin films on surfaces 16, 17 and 18 greatly increases the heat transfer rate between the condensation chambers and the distillation chamber. Consequently less surface area is required thereby greatly reducing the size of the apparatus. Furthermore, the operational cost is reduced by requiring a small temperature differential between the surfaces 16, 17 and 18. A further advantage of the thin film is to reduce the effective thickness of the liquid to lower the mean path of the molecules in moving from the liquid to the vapor phase and thereby substantially increase the mass transfer rate between the liquid and vapor phases. Also important is the high surface area to liquid mass ratio that is provided which minimizes the temperature gradient between the heat transfer surface and the liquid surface in contact with the vapor.

The wall 15 can be made from sheet metal with the guides 51 and 61 rolled into the wall at very little expense. There is no need for extruding the wall or the guides. The star-shaped tube 72 or an accordion-shaped wall can be formed by merely bending the sheet metal at desired intervals and folding the wall to the desired shape. This enables the heat transfer walls and surfaces to be constructed quite reasonably thereby reducing the cost of manufacture. A particular advantage of the star-shaped tube 72 or the accordion-shaped wall is the versatility of being able to vary the spacing between the walls to control the vapor flow without limiting the area of the heat transfer surface.

It should be understood that the above described embodiments are simply illustrative of the principles and some of the uses of this invention and that other embodiments and uses may be readily devised by those skilled in the art without deviating from the principles thereof. Therefore, only the following claims are intended to define this invention.

What I claim as my invention is:

1. An interphase mass transfer process for transferring mass at essentially saturated equilibrium conditions between a liquid phase and a vapor phase of a multicomponent material according to the partial pressures of the components to progressively increase the concentration of the higher boiling point components in the liquid phase and to progressively increase the concentration of the lower boiling point components in the vapor phase, comprising the steps of:
    continuously feeding a liquid phase of the multi-component stream into an enclosing evaporation chamber having an upright heat transfer surface therein;
    spreading the liquid phase on said heat transfer surface solely by gravity to form a downward laminar flowing thin liquid film of less than .005 in. thick;
    simultaneously with spreading the liquid phase on the heat transfer surface, supplying sufficient heat to the heat transfer surface to continuously evaporate only a portion of the liquid phase from the laminar flowing thin film to form a vapor phase and to progressively vary the partial pressures of the components as the film flows over the heat transfer surface;
    directing the formed vapor phase upward in the enclosing chamber countercurrent to the flow of thin liquid flow;
    while the vapor phase is directed upward countercurrent to the flow of the thin film, maintaining the vapor phase in continuous contact with the flowing thin liquid film to establish an essentially saturated equilibrium between the phases as the liquid phase flows over the heat transfer surface and thereby progressively transfer the higher boiling point components from the vapor phase to the liquid phase and progressively transfer the lower boiling point components from the liquid phase to the vapor phase according to the varying partial pressures of the components as the phases are directed countercurrent to each other; and
    separately removing both phases from the enclosing chamber after the phases have passed over the heat transfer surface while being maintained in said intimate contact with each other in essentially saturated equilibrium.

2. The interphase mass transfer process as defined in claim 1 wherein said process is performed at each stage in a series of stages in which the removed liquid phase from each stage is utilized as a feed liquid phase of an adjacent stage to progressively decrease the lower boiling point component therefrom and progressively increase the higher boiling point component therein.

3. The interphase mass transfer process as defined in claim 1 wherein said process is performed at each stage in a series of stages, further comprising the steps of:
    directing the removed vapor phase from at least one of the stages to another stage in the series;
    condensing at least a portion of said removed vapor phase at said other stage; and
    transferring the latent heat of vaporization produced by said condensation to the heat transfer surface of said other stage.

4. The interphase mass transfer process as defined in claim 1 wherein the multicomponent material includes the components of water and alcohol.

5. The interphase mass transfer process as defined in claim 1 wherein the feed multicomponent material liquid phase is an industrial waste liquid having components of water and mineral acid.

6. The interphase mass transfer process as defined in claim 1 wherein the feed multicomponent material liquid phase is an industrial waste liquid having components of water and $NH_3$.

7. The interphase mass transfer process as defined in claim 1 further comprising the steps of:
feeding the vapor phase removed from the first enclosing chamber in one direction over a second heat transfer surface in a second enclosing chamber;
removing sufficient heat from the vapor phase in the second enclosing to condense only a portion of the vapor phase onto the second heat transfer surface to form a distillate liquid phase to progressively vary the partial pressure of the components over the second heat transfer surface;
simultaneously with the formation of the distillate liquid phase directing the distillate liquid phase over the second heat transfer surface in an opposite direction countercurrent to the vapor phase in a laminar flowing thin liquid film having a thickness of less than five thousands of an inch;
maintaining the vapor phase and the distillate liquid phase in intimate continuous contact with each other as the phases flow countercurrent over the second heat transfer surface to establish an essentially saturated equilibrium between the phases over the second heat transfer surface and thereby progressively transfer the higher boiling point components from the vapor phase to the liquid phase and progressively transfer the lower boiling point components from the liquid phase to the vapor phase according to the varying partial pressures over the second heat transfer surface;
separately removing the remainder of the vapor phase and the distillate liquid phase from the second enclosing chamber after the phases have passed over the second heat transfer surface while being maintained in said intimate contact with each other in essentially saturated equilibrium so that the distillate liquid phase removed from the second enclosing chamber has a component concentration essentially equal to the saturation equilibrium liquid concentration of the vapor phase removed from the first enclosing chamber.

8. The interphase mass transfer process as defined in claim 7 wherein the distillate liquid phase removed from the second chamber is recycled back to the first chamber and added to the feed liquid phase.

9. The interphase mass transfer process as defined in claim 7 wherein the process is performed at each stage in a series of stages with the added step of adding the distillate liquid phase from the second chamber to the feed liquid phase being fed to the first chamber of the same stage.

10. The interphase mass transfer process as defined in claim 7 further comprising the steps of:
utilizing a thin wall between the first chamber and the second chamber with one side surface of the wall serving as the first heat transfer surface and the opposite side surface of the wall serving as the second heat transfer surface; and
before directing the vapor phase removed from the first chamber over the second heat transfer surface, compressing the removed vapor phase by adding heat and pressure to provide a tempertaure differential between the two surface to drive the latent heat of vaporization from the second heat transfer surface to the first heat transfer surface to evaporate the portion of the liquid phase in the first enclosing chamber.

11. The interphase mass transfer process as defined in claim 10 further comprising the step of:
directing the vapor phase removed from the second enclosing chamber into a third enclosing chamber having a portion of said thin wall in common with the first enclosing chamber defining a third heat transfer surface opposite the first heat transfer surface;
condensing the vapor phase directed into the third enclosing chamber on the third heat transfer surface to form a condensate liquid having a high concentration of the low boiling point components;
transferring the latent heat of vaporization from the third heat transfer surface through said thin wall to the first heat transfer surface; and
removing the condensed liquid from the third enclosing chamber.

12. The interphase mass transfer process as defined in claim 11 wherein said process is performed at each of a series of stages, with the added step of recycling the removed condensate liquid from the third chamber to the first chamber of an upstream adjacent stage and added to the feed liquid phase thereof.

13. The interphase mass transfer process as defined in claim 12 further comprising the step of adding the distillate liquid phase removed from the second enclosing chamber to the feed liquid phase entering the first enclosing chamber of the same stage.

14. An interphase mass transfer process for transferring mass at essentially saturated equilibrium conditions between a liquid phase and a vapor phase of a multicomponent material according to the partial pressures of the components to progressively increase the concentration of the higher boiling point components in the liquid phase and to progressively increase the concentration of the lower boiling point components in the vapor phase, comprising the steps of:
continuously feeding a vapor phase of a multi-component material into an enclosing condensing chamber having an upright heat transfer surface therein;
directing the vapor phase in an upward flow;
removing sufficient heat from the heat transfer surface to continuously condense only a portion of the vapor phase onto the heat transfer surface to form a liquid phase thereon;
simultaneously with the formation of liquid phase, spreading the formed liquid phase on the heat transfer surface solely by gravity to form a thin liquid condensate film of less than .005 in. in thickness laminarly flowing downward counter current to the flow of the vapor phase;
while the vapor phase is flowing upward, maintaining the vapor phase in intimate continuous contact with the flowing thin liquid film to establish an essentially saturated equilibrium between the phases as the liquid phase flows over the heat transfer surface and thereby progressively transfer the higher boiling point components from the vapor phase to the liquid phase and progressively transfer the lower boiling point components from the liquid phase to the vapor phase according to the varying partial pressures of the components as the phases are directed countercurrent to each other; and
separately removing both phases from the enclosing chamber after the phases have passed over the heat transfer surface while being maintained in said intimate contact with each other in essentially saturated equilibrium.

15. The interphase mass transfer process as defined in claim 14 wherein the vapor phase removed from the enclosing chamber is directed over a second heat transfer surface of a second enclosing chamber and wherein at least a portion of the vapor is condensed onto the second heat transfer surface.

16. An isotope separation process for separating a heavy isotope and a light isotope of an element from a liquid phase of the element in an enclosed distillation chamber according to different partial pressures of the isotopes, comprising the steps of:
directing the liquid phase over a heat transfer surface in the enclosed distillation chamber;

spreading the liquid phase by gravity on the heat transfer surface in a laminar flowing thin liquid film of less than five thousands of an inch in thickness;

simultaneously adding sufficient heat to the heat transfer surface to evaporate only a portion of the liquid phase to form a vapor phase and to progressively vary the partial pressure of the isotopes as the film flows over the heat transfer surface;

directing the formed vapor phase over the thin film of liquid phase in the opposite direction countercurrent to the flow of the thin film;

continually maintaining the vapor phase in intimate continuous contact with the flowing thin liquid film without the flowing vapor disturbing the laminar flow of the thin film to establish an essentially saturated equilibrium between the phases as the liquid phase flows over the heat transfer surface and thereby progressively transfer the heavy isotope from the vapor phase to the liquid phase and progressively transfer the light isotope from the liquid phase to the vapor phase according to the varying partial pressures of the isotopes as the phases are directed countercurrent to each other; and separately removing both phases from the enclosing chamber after the phases have passed over the heat transfer surface while being maintained in said intimate contact with each other in essentially saturated equilibrium.

17. The isotope separation process as defined in claim 16 further comprising the steps of:

directing the removed vapor phase in one direction over a second heat transfer surface in a condensation chamber;

removing sufficient heat from the vapor phase in the second enclosing chamber to condense only a portion of the vapor phase onto the second heat transfer surface to form a distillate liquid phase to progressively vary the partial pressure of the isotopes over the second heat transfer surface;

simultaneously with the formation of the distillate liquid phase directing the distillate liquid phase over the second heat transfer surface in an opposite direction countercurrent to the vapor phase in a laminar flowing thin liquid film having a thickness of less than five thousands of an inch;

maintaining the vapor phase and the distillate liquid phase in intimate continuous contact with each other as the phases flow countercurrent to each other to establish an essentially saturated equilibrium between the phases and thereby progressively transfer the heavy isotope from the vapor phase to the liquid phase and progressively transfer the light isotope from the liquid phase to the vapor phase according to the varying partial pressures as the phases are directed countercurrent to each other;

separately removing the remainder of the vapor phase and the distillate liquid phase from the second enclosing chamber after the phases have passed over the second heat transfer surface while being maintained in said intimate contact with each other in essentially saturated equilibrium so that the distillate liquid phase removed from the second enclosing chamber has an isotope concentration essentially equal to the saturation equilibrium liquid concentration of the vapor phase removed from the first enclosing chamber.

References Cited

UNITED STATES PATENTS

| | | | |
|---|---|---|---|
| 2,032,182 | 2/1936 | Oman | 159—136 X |
| 3,190,817 | 6/1965 | Neugelaver et al. | 202—236 |
| 3,366,158 | 1/1968 | Rosenblad | 159—13 B |
| 3,397,730 | 8/1968 | Fritz | 159—13 B |
| 3,568,766 | 3/1971 | Thomas | 202—236 X |
| 2,009,175 | 7/1935 | Goth | 159—13 C X |
| 2,942,657 | 6/1960 | Kleinschmidt | 159—24 R X |
| 3,099,607 | 7/1963 | Lustenader et al. | 159—24 R X |
| 2,437,594 | 3/1948 | Denys | 202—236 X |
| 3,054,729 | 9/1962 | Smith | 203—89 X |

FOREIGN PATENTS

| | | | |
|---|---|---|---|
| 279,526 | 10/1927 | Great Britain | 159—13 R |

NORMAN YUDKOFF, Primary Examiner

J. SOFER, Assistant Examiner

U.S. Cl. X.R.

203—26, 72, 73, 74, 78, 81, 21, 24; 202—163, 172, 173, 174, 185, 236; 159—13 B, 49